United States Patent
Barsoum et al.

(10) Patent No.: US 7,300,893 B2
(45) Date of Patent: Nov. 27, 2007

(54) ARMOR INCLUDING A STRAIN RATE HARDENING ELASTOMER

(75) Inventors: Roshdy George S. Barsoum, McLean, VA (US); Dudt Philip, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 257 days.

(21) Appl. No.: 10/864,317

(22) Filed: Jun. 10, 2004

(65) Prior Publication Data

US 2007/0111621 A1    May 17, 2007

(51) Int. Cl.
*B32B 27/12*    (2006.01)
*B32B 27/04*    (2006.01)
*B32B 5/16*    (2006.01)

(52) U.S. Cl. .................. 442/134; 442/135; 428/402; 428/403; 428/406; 428/407; 428/911; 2/2.5; 89/36.01; 89/36.02; 89/36.05

(58) Field of Classification Search .............. 442/134, 442/135; 428/911, 402, 403, 406, 407; 2/2.5; 89/36.01, 36.02, 36.05
See application file for complete search history.

(56) References Cited

U.S. PATENT DOCUMENTS 6,532,857 B1    3/2003    Shih et al.

2002/0178900 A1 *    12/2002    Ghiorse et al. ............ 89/36.02

OTHER PUBLICATIONS

Mine & Collision Protection for Passenger Vehicle, U.S. Appl. No. 10/829,616, filed Apr. 22, 2004, Inventors: Barsoum et al. (paragraph 0015).

www.ics.u-strasbg.fr/g-4/macapcl/Mecanique_Physique/ Introduction/PDF_files/ImpactPCPUPC.pdf, PDF filed entitled "Experimental study and numerical simulations of the Impact behaviour of polycarbonate and polyurethane multilayer," by Cros et al. (filed dated Feb. 11, 2004, actual date of paper unknown).

Cros et al., Experimental and numberical analysis of the impact behaviour of polycarbonate and polyurethane multilayer, J. Phys. IV, France 10 (2000), Pr9-671-Pr9-676.

* cited by examiner

*Primary Examiner*—Ula C. Ruddock
(74) *Attorney, Agent, or Firm*—James B. Bechtel; Linda M. Deschere; Barry A. Edelberg

(57) ABSTRACT

Protection against blast and ballistic damage is improved by encapsulating or sandwiching rigid inclusions (for example, tiles) or a rigid plate by a high-strain rate hardening elastomer. Typical high-strain rate hardening elastomers include polyurea and polyurethane. If desired, the inclusion or plate may be wrapped in a cloth and/or fabric before encapsulation/sandwiching. The armor may be used independently of a substrate or may be attached by any means to a substrate that it is intended to protect.

29 Claims, 6 Drawing Sheets

ARMOR INCLUDING A STRAIN RATE HARDENING ELASTOMER

CROSS REFERENCE TO RELATED APPLICATIONS

This application claims the benefit of the Apr. 23, 2004 filing date of the provisional application entitled "STEEL OR CERAMIC ARMOR ENCAPSULATED OR SANDWICHED BY A POLYMER HAVING HIGH STRESS HARDENING," U.S. Ser. No. 60/564,584, invented by Roshdy George S. Barsoum and Phillip Dudt, the entirety of which has been incorporated herein by reference.

BACKGROUND OF THE INVENTION

1. Field of the Invention

The present invention relates generally to lightweight armor and more specifically to lightweight armor for dual protection of property and personnel from ballistic projectiles and blasts.

2. Description of the Background Art

Conventional ballistic- and blast-resistant materials provide protection through a number of mechanisms such as plastic/elastic deformation, momentum reduction, and specifically break-up of the projectile, erosion, and cominution for ballistic protection.

Shih et al. (U.S. Pat. No. 6,532,857, issued Mar. 18, 2003) (the entirety of which is incorporated herein for all purposes) encapsulated an array of ceramic tiles in an elastomer, typically a polysulfide. The elastomer is was used to (1) attenuate stress waves, (2) accommodate the lateral displacement of ceramic fracturing and (3) isolate adjacent tiles during the backing vibration stage. At high strain rates and temperatures corresponding to ballistic events, Shih's elastomer exhibits the behavior of rubber. Shih et al. requires two casting processes and vulcanization under pressure. In addition, it requires two grades of elastomers: surface rubber to protect against the non-ballistic battlefield environment and interior rubber which will control the dynamic response of the armor.

SUMMARY OF THE INVENTION

It is an object of the present invention to provide an armor material with resistance to both blast and ballistic energy.

It is another object of the present invention to provide an armor material with strong resistance to shock waves.

It is a further object of the present invention to provide an armor material in which a volume of rigid armor is confined along three dimensions when exposed to ballistic or blast energy.

These and other objects are achieved by encapsulating or sandwiching a rigid inclusion or plate in a strain rate hardening elastomer.

DETAILED DESCRIPTION OF THE PREFERRED EMBODIMENTS

Figure 1:
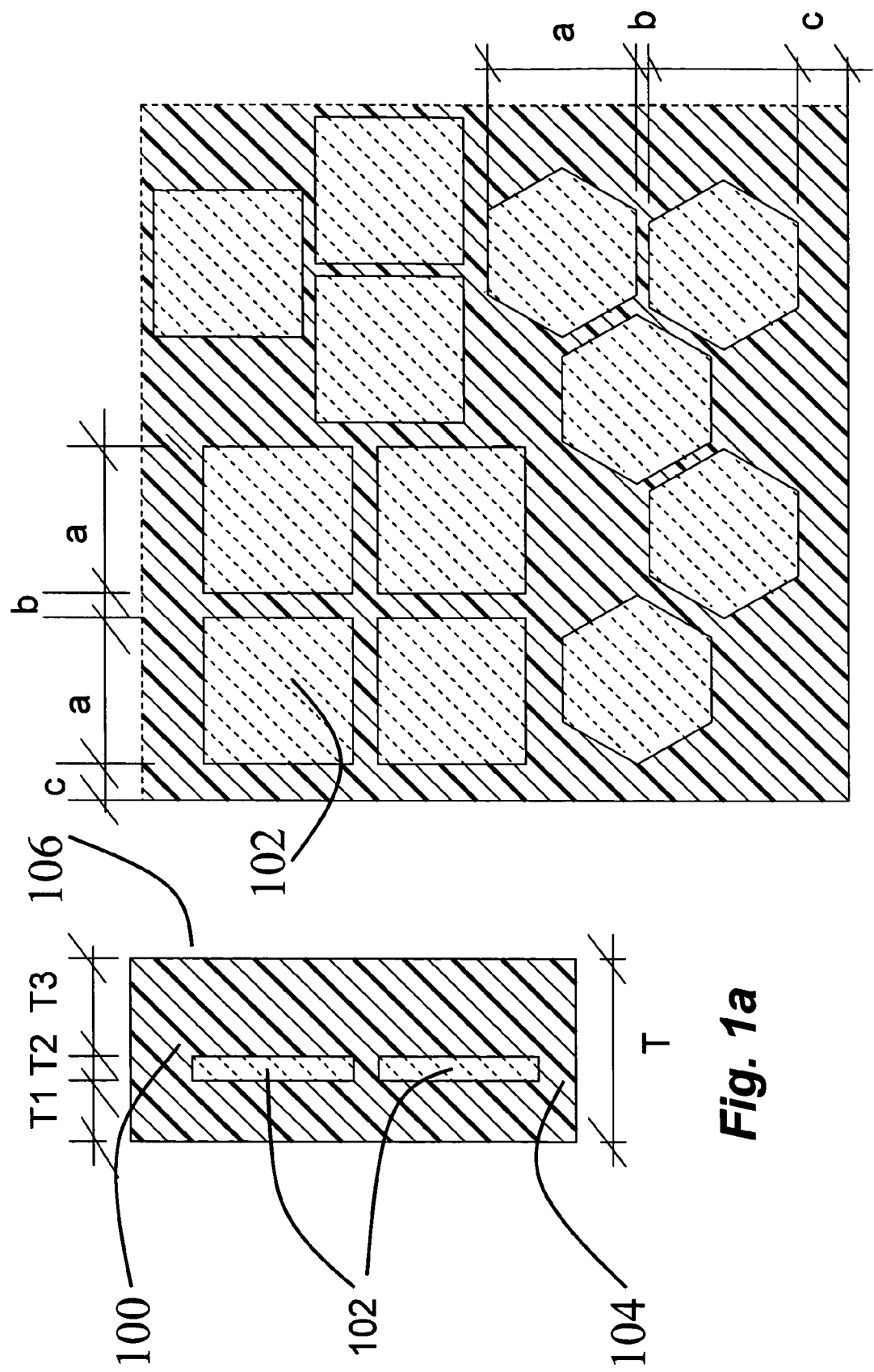
FIG. 1a shows the cross-sectional view of encapsulated ceramic tiles in polyurea, and the backing structural material, according to the present invention.
FIG. 1b shows a plan view of encapsulated ceramic tiles in polyurea according to the present invention.

Any array or a plate of a rigid material, such as ceramic, metal, polycarbonate, or composite inclusions or a metal, composite or ceramic plate, is encapsulated or sandwiched by an elastomer having high strain rate hardening. Typically, elastomers useful in the present invention have a strain rate sensitivity hardening of 10,000/second to 1,000,000/second, and include, for example, some polyurethanes and some polyureas. Generally, elastomers having this characteristic will meet the following criteria in low rate of loading conditions:

Young's modulus of 700-1000 psi at 100% strain;
Young's modulus of 1200-1400 psi at 300% strain;
Young's modulus of 4000-6000 psi at 400% strain;
Elongation in the range of 200-800%, typically more than about 400%;
Tensile strength of 2000-8000 psi;
Poison's ratio 0.45-0.49 (as close to 0.5 as possible, which makes it incompressible).

As a result of high rate sensitivity, the Young's modulus of elastomers useful in the present invention increases at high rate loading (e.g. rate loading of about 5000-6000/sec) from about 400 psi to about 20,000 psi-30,000 psi under unconfined conditions and about 500,000 psi-600,000 psi under confined conditions. The elastomer (throughout the specification and the claims that follow, the term "elastomer" includes blends of more than one elastomer or blends of an elastomer with a material (e.g., plasticizers, antioxidants, etc.) that enhances it's usefulness, unless otherwise stated) chosen will depend on the application for which the armor material of the present is intended. Table 1 shows the properties of some typical materials which exhibit the strain rate sensitivity, required to achieve the desired performance in blast and armor applications.

TABLE 1

| | POLYUREA PROPERTIES | | |
|---|---|---|---|
| | Plasite SEMSTONE 403 | Air Products Versalink 1000 | SPI Polyshield Hi-E |
| Tensile Strength | 2300 psi | 8000 psi | 2500 psi |
| Elongation | 400% | 460% | 720% |
| Hardness Shore A | — | 95 | 81 |
| Shore D | 46 | — | 39 |

TABLE 1-continued

POLYUREA PROPERTIES

| | Plasite SEMSTONE 403 | Air Products Versalink 1000 | SPI Polyshield Hi-E |
|---|---|---|---|
| 100% Modulus | — | 1000 psi | 780 psi |
| 300% Modulus | — | 1400 psi | 1240 psi |

The rigid (i.e., rigid compared to the elastomer) encapsulated or sandwiched material of the present invention is typically metal, ceramic, or composite. Any metal (e.g., steel (such as high-hard steel), titanium, aluminum, and aluminum alloys) typically used for armor plating may be encapsulated or sandwiched to make the armor of the present invention. Alternatively, the rigid material may be a polymer, such as polycarbonate. An advantage of the present invention is that the confinement provided by the hardening of the elastomer improves the ballistic and blast protection performance of lightweight, inexpensive materials such as aluminum and ceramics.

The selection between a ceramic inclusion, a composite tile/plate, and a metal plate encapsulated or sandwiched material depends mainly upon factors such as cost, weight, flexibility, etc. Although several encapsulated metal tiles or other inclusions may be used in place of a single sandwiched metal plate, diminished performance may result. Where large plates of metal are sandwiched between layers of an elastomer according to the present invention, the metal surrounding the portion of the metal plate impacted by ballistic or blast energy laterally confines the impacted portion. Therefore, in this embodiment, the elastomer need not completely encapsulate the metal plate.

It is possible to make powder metallurgy inclusions (such as tiles) or plates that would have superior strength and could provide extra stopping power. Inclusions could be fabricated from liquid metal particles with high quantities of nitrogen for example for very high strength. Also cermets, mixes of metals and ceramics, might have possibility as well. For example, metal could be cast with insoluble titanium diborides or titanium oxides included in the mix to provide additional stopping power. There is a great deal of potential in materials for this purpose.

FIG. 1a shows embodiment 100 of the present invention. Ceramic tiles 102 of thickness T2 are encapsulated within an elastomer (e.g., polyurea) 104 having high strain rate hardening. A thickness T1 of elastomer 104 covers the front surface of tiles 102. Tiles 102 are backed by a thickness T3 of elastomer 104.

Figure 2:
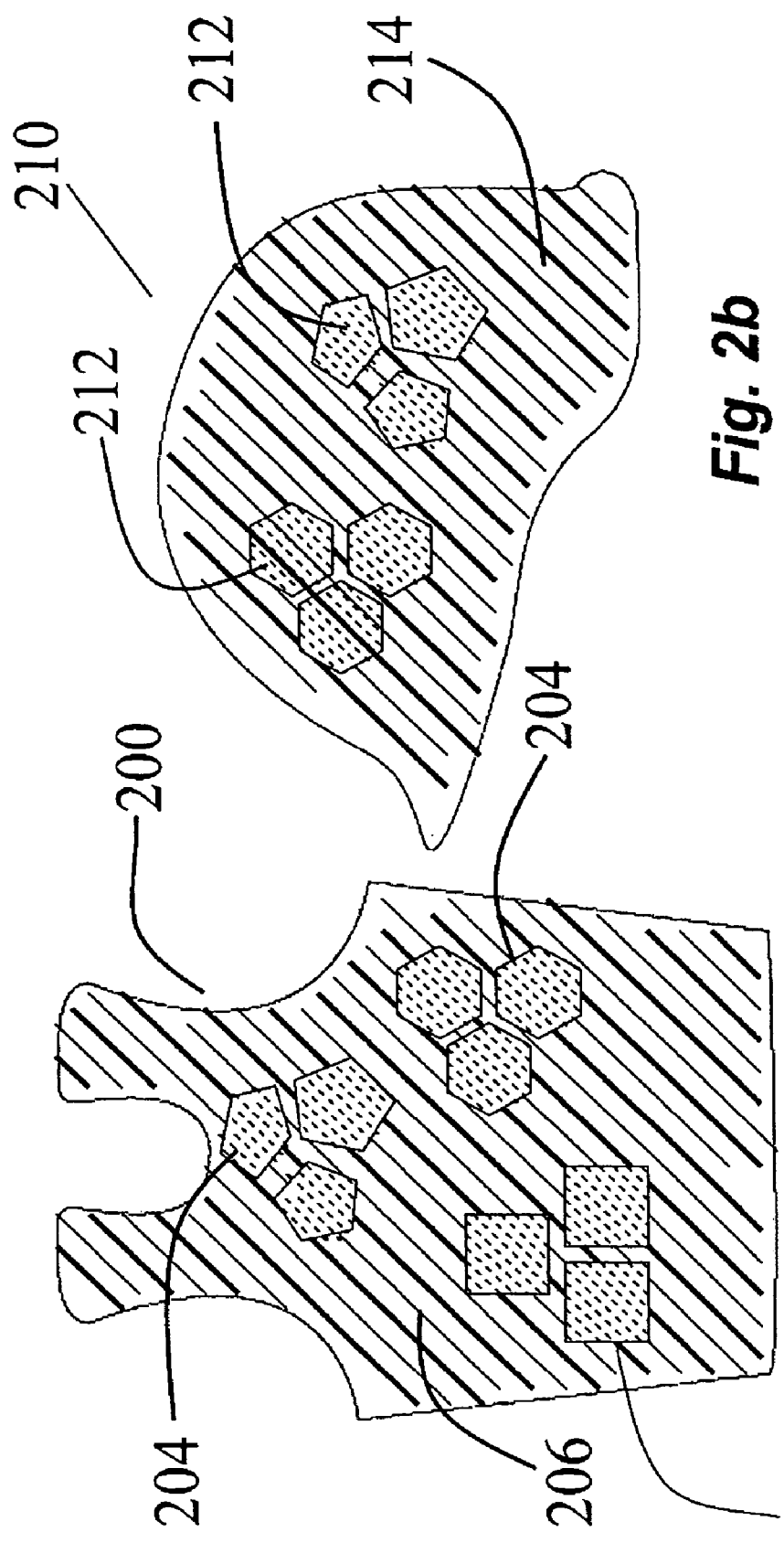
FIG. 2a and FIG. 2b show types of arrangements for encapsulation of ceramic tiles in curved surfaces such as body armor and helmets.

As shown in FIG. 1b, tiles 102 have dimensions "a" and "c." A gap of dimension "c" exists between the tiles. Unlike in Shih et al., gap "c" is not critical to the ballistic/blast protection offered by the present invention. Gap "c," however, is useful in enhancing the flexibility and shape-forming ability of the armor according to the present invention. Generally, gap "c" should be large enough to allow the armor to assume the desired shape/flexibility. A gap larger than necessary, however, needlessly increases the likelihood of penetration. Clearly, the exact dimensions for "a," "b," and "c" ("a" is the length/width, "b" is the distance between tiles, and "c" is distance from the edge of the tile to the edge of the elastomer layer) are dependant upon the desired end use. Similarly, the desired tile thickness must balance the ability of thicker tiles to better resist penetration with weight considerations. Tiles 102 need not have a square or rectangular cross-section, but may be any a cross-section of any shape, for example hexagonal, pentagonal, octagonal, circular, oval, etc., as shown in FIG. 2a and FIG. 2b. In FIG. 2a, vest 200 includes a variety of symmetric and asymmetrically shaped inclusions 204 of ceramic or other rigid material in encapsulated within elastomer 206 which serves as a matrix. In FIG. 2b, helmet 210 is protected by an armor which includes a variety of symmetric and asymmetrically shaped inclusions 212 of ceramic or other rigid material in encapsulated within elastomer 214.

Figure 3:
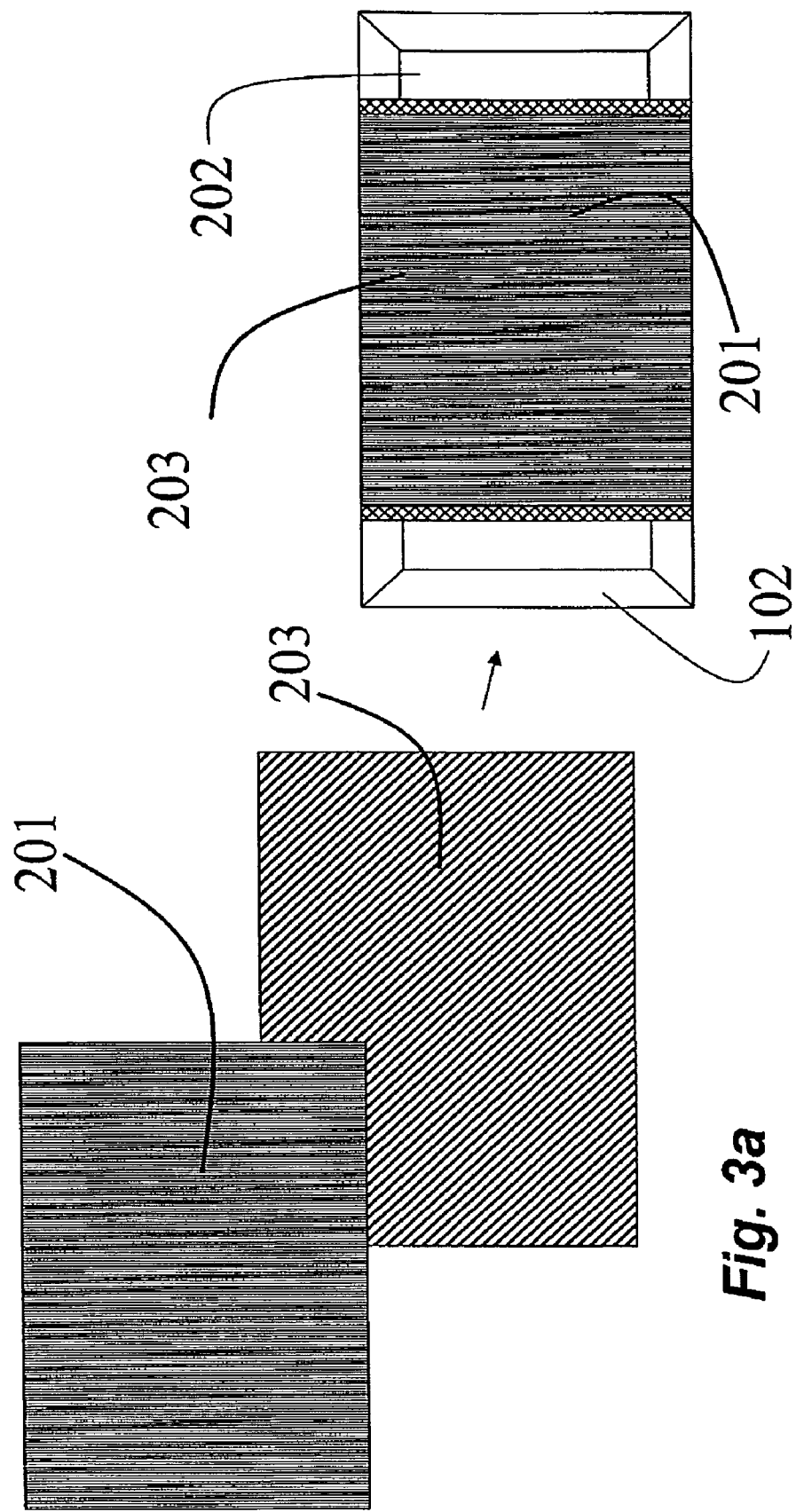
FIG. 3a and FIG. 3b show one method by which a ballistic cloth or fiber, such as Kevlar™ (aramid) or Spectra™, may be wrapped around a ceramic tile to be encapsulated according to the present invention.

FIG. 3a and FIG. 3b show an improvement in which a Kevlar™, Spectra™, ballistic cloth, ballistic fiber (e.g., E-glass), or other (typically highly flexible) blast/ballistic-resistant material layer 201 is placed on a sticky, typically flexible backing 203 and wrapped around ceramic tile 102. Ceramic tile 102 is then encapsulated within. Ballistic layer 201 and elastomer 104 together further support confinement of ceramic tile 102. Backing 203 can also co-cure within elastomer 104.

Figure 4:
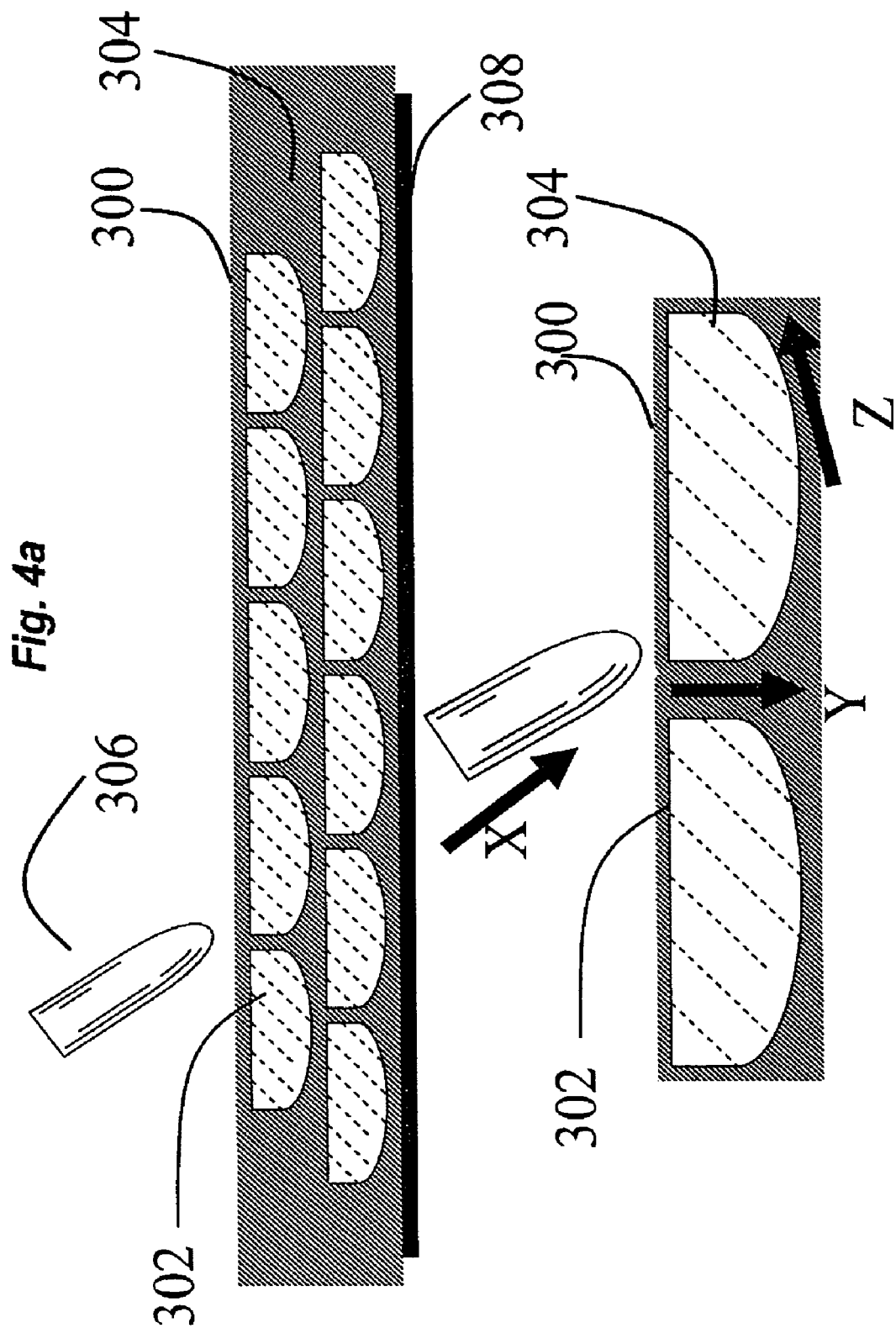
FIG. 4a and FIG. 4b shows the engagement of a projectile with an array of hard-faced balls (or other shape) of ceramic or steel arrays of hard-faced balls (or other shape) of ceramic or steel with the sandwich armor according to the present invention.

FIG. 4a and FIG. 4b show embodiment 300 of the present invention in which and array of semispherical ceramic inclusions 302 are encapsulated by elastomer 304 having a high strain-rate hardening. This armor is attached to substrate 308. As shown in these figures, the semispherical shape of inclusions 302 converts off-axis momentum from a penetrator 306 into torque. As a result, a portion of the energy of penetrator 306 is dissipated by rotation of inclusion 302 within elastomer 304.

Figure 5:
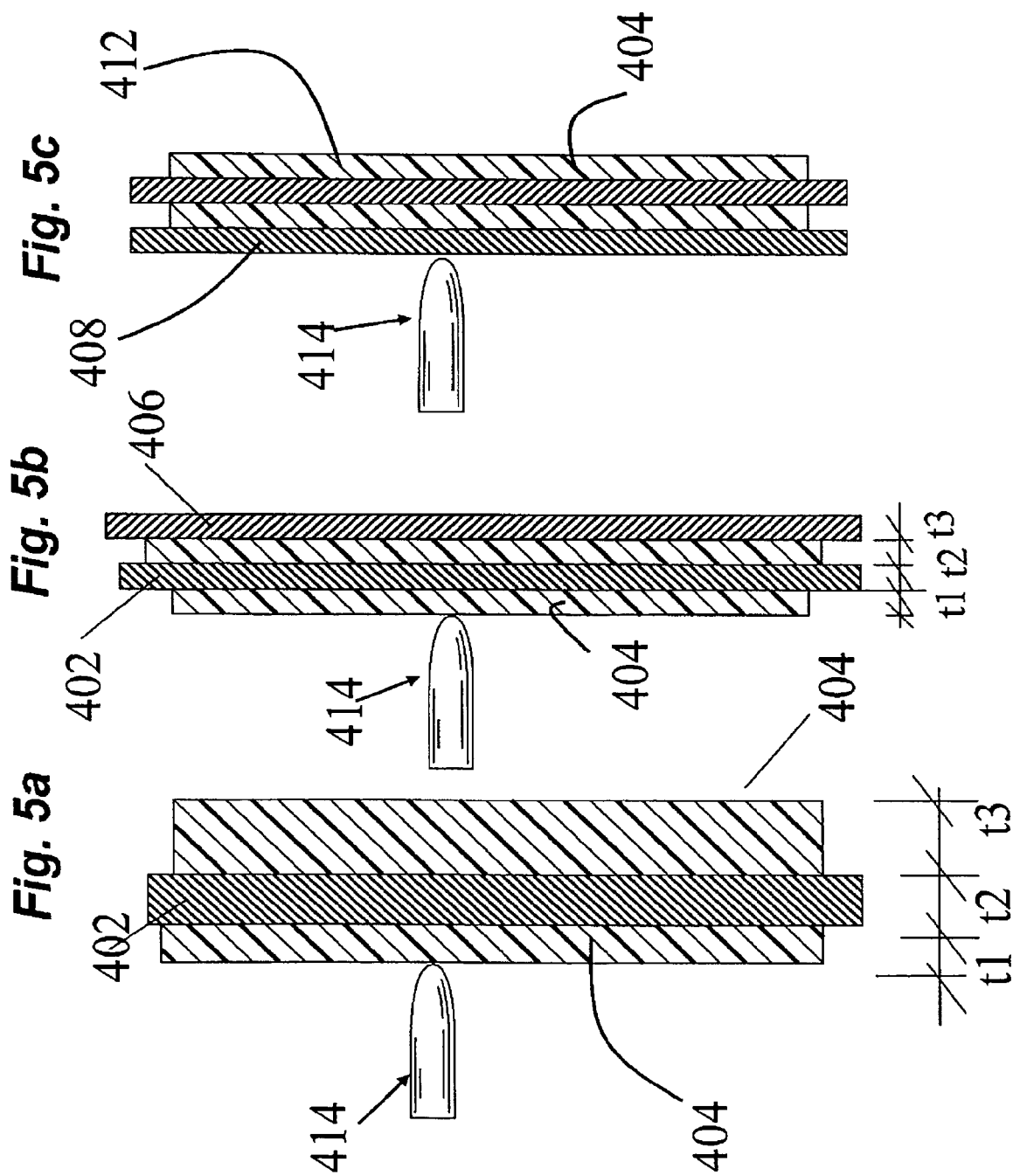
FIG. 5a shows the front and cross-sectional view of sandwich-type armor with front and back application of the elastomer (polyurea).
FIG. 5b show another arrangement according to the present invention in which an elastomer is on the outer surface of the sandwich and is weakly bonded to another surface.
FIG. 5c shows another embodiment of the present invention.

FIG. 5a, FIG. 5b, and FIG. 5c show embodiments of the present invention in which a metal plate is sandwiched between two layers of elastomer having high strain-rate hardening. Although both layers of elastomer will typically have the same composition, they do not need to have identical behavior or composition. In FIG. 5a, a metal plate 402, is sandwiched between, and loosely bonded to, layers of elastomer 404. In FIG. 5b, metal plate is likewise sandwiched between layers of elastomer 404. However, an additional metal plate 406 and the rear surface of the inner layer of elastomer 404 further confines the elastomer and contributes to the elastomer's strain hardening. FIG. 5c shows the reverse of the FIG. 5b arrangement. Thin metal plate 408 is bonded to the front surface of a layer of elastomer 410 that is sandwiched between metal plates 408 and 412. The back of the metal plate 412 is directly adhered to a layer of elastomer 410. In the FIG. 5c embodiment, the sandwiching of the layer of elastomer 408 contributes to its strain hardening. In FIGS. 5a, 5b, and 5c, the front surface of the armor is the surface facing projectile 414.

Figure 6:
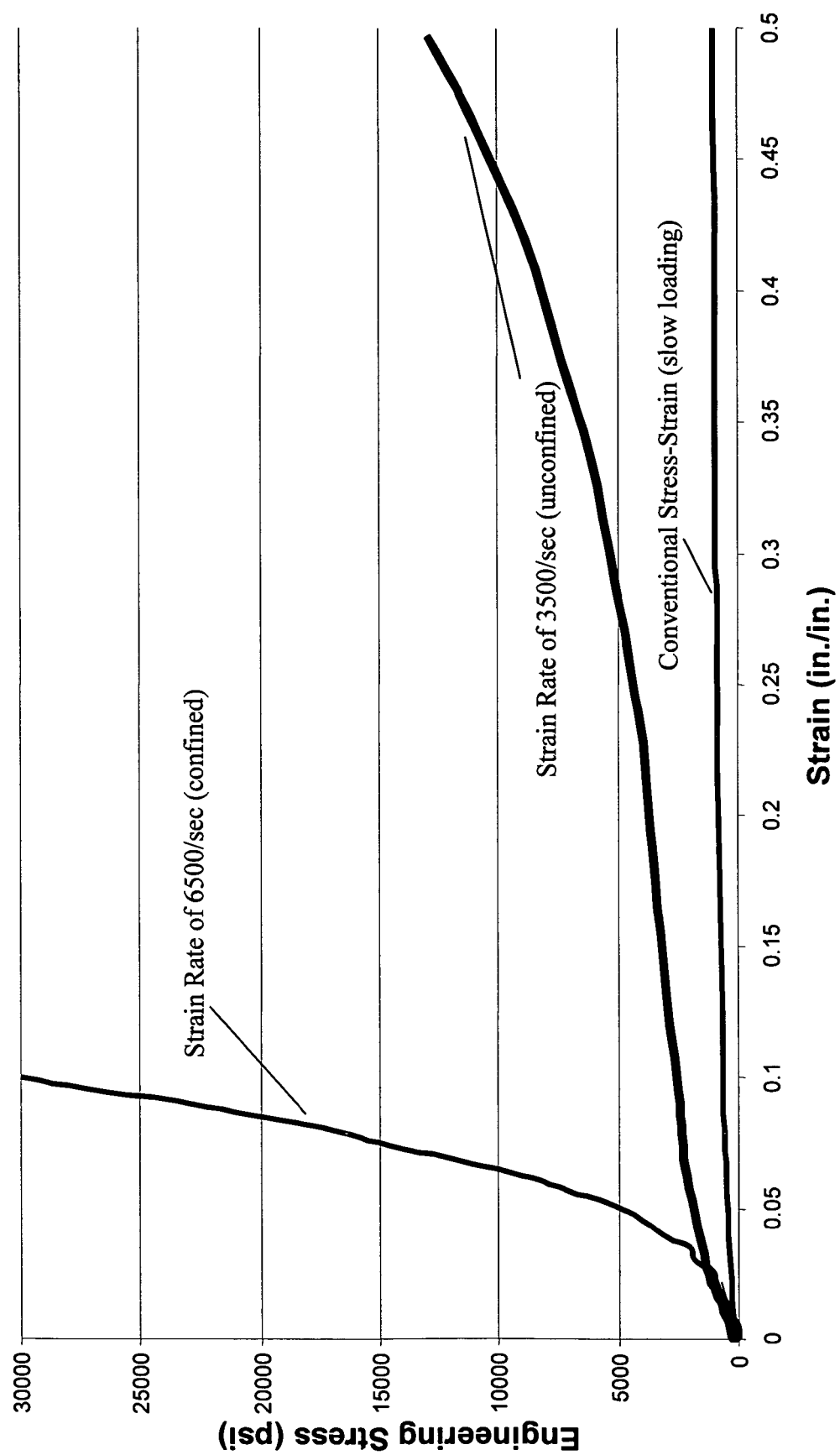
FIG. 6 shows the change from slow loading to very high strain rate behavior of a typical elastomer useful in the present invention.

Defeating blast and ballistic threats normally makes use of conventional approaches, plastic deformation, momentum reduction, etc. as mentioned above. It is theorized that the present invention, while relying in-part upon conventional mechanisms, uses additional mechanisms to defeat blast and ballistic threats. In the case of ballistic impact, under the extremely high strain rate (up to $10^6$/sec), which is initially generated by the projectile impact on the outer surface of the elastomer (e.g. polyurea), the elastomer will dynamically stiffen, introducing reflected shock waves with even higher intensity, and hence reduce the velocity of projectile before it engages the underlying encapsulated volume(s). These high intensity shock waves result from strain rate sensitivity and confinement which causes the elastomer to dynamically strengthen and stiffen and results in a significant increase of the wave speed in the elastomer (FIG. 6 shows typical behavior for a desired elastomer). After penetrating the front layer of the elastomer, the underlying encapsulated volume material is impacted. After shock waves reach the encapsulated volume they will propagate into the surrounding elastomer encapsulant, which will result in dynamically strengthening and stiffening the elastomer on the back face as well to increase its dynamic properties/bulk modulus. These two effects will further confine the encapsulated volume, thus reducing the onset of failure from fracture or shear plugging, depending on the damage mechanism in the encapsulated material. To restate by further example, if the encapsulated material is of a brittle nature (e.g. alumina), it will become highly confined under compressive hydrostatic stress, which will increase its fracture strength and resistance to the penetrator. The armor will engage the projectile as discussed in the background above, but with much improved transient strength and stiffness characteristics because of the confinement. Finally, the remainder of the projectile, which might not have been stopped in the initial phase of the engagement, would be further defeated by wave reflection and the absorption of energy by the backing elastomer. Other mechanisms are also involved in this final stage, such as surface decohesion of the elastomer and momentum trapping. Under oblique impact the instant invention will be even more effective than the previous state of the art, since it will further deflect the projectile before it engages with the encapsulated volume. (And when the projectile engages with the encapsulated volume, it will be at lower velocity and higher obliquity.)

In blast loading, the strain rates are of the order ($10^3$-$10^4$/sec), which also contribute to dynamic strengthening and stiffening and confinement of the elastomer. FIG. 6 shows the change from slow loading to very high strain rate behavior.

The actual encapsulation or sandwiching can be accomplished by casting, spraying, or by a trowelling of the elastomer around the volumes. The installation of the dual armor can also be in the form of a finished tile or panel/appliqué, which in turn can be glued to the surface of the platform to be protected by adhesive bonding or by mechanical attachment.

The armor composite of the present invention may be used without a substrate or can be attached to a variety of substrates, e.g., aluminum, steel, fiber reinforced plastic, clothing, and canvas. The armor may also be used without a substrate.

An advantage of armor of the present invention is that it combines protection from both ballistic and blast threats in a relatively low-weight, low-cost configuration. Making use of the high-rate properties of certain rate-sensitive elastomers as an encapsulant for enhancing damage resistance is a new feature that permits design of the dual-purpose armor. The ability to use encapsulated arrays of material permits the use of components, e.g. liquid metals, rapidly quenched volumes, where only small sizes can be practically produced, to be used for ballistic purposes. Further cost savings could be realized using low-cost ceramics, e.g. porcelains, whose response could be made equivalent to that of more costly alumina or boron carbides through augmentation by the elastomers. For protection of structures where the threat was well defined, the dual armor could result in weight savings where benefits derived from thinner/lighter ceramic, for example, with the low density elastomer dual armor combination could offset a heavier configuration containing only thicker/heavier ceramic tiles. In addition, less costly armor steels in conjunction with the elastomer could be as effective as more costly heavily treated armor steels. Given that availability of such steels is often limited, rapid substitution of less costly steels as a dual armor with the elastomer gives potential for more rapid response in time of emergency. The flexibility of the concept enhances the capability to develop armors in complex contours and irregular surfaces such as body armor and aircraft armor and to use complex shapes of encapsulated volumes.

Obviously, many modifications and variations of the present invention are possible in light of the above teachings. It is therefore to be understood that, within the scope of the appended claims, the invention may be practiced otherwise than as specifically described.

What is claimed is:

1. An armor composite comprising an elastomer having a plurality of rigid inclusions, said rigid inclusions being completely encapsulated within said elastomer, said elastomer having a strain rate sensitivity-hardening of about 1000/sec to 1,000,000/sec and undergoing strain rate hardening under both ballistic and blast conditions, wherein said elastomer comprises polyurea or a blend or polyurea and polyurethane.

2. The armor composite of claim 1, wherein said elastomer has a Young's modulus of at least about 4000 psi at 400% strain.

3. The composite of claim 2, wherein said elastomer has a strain rate sensitivity hardening of about 10,000/sec to 1,000,000/sec.

4. The composite of claim 1, wherein said elastomer has an elongation of at least about 400%.

5. The composite of claim 1, wherein said rigid inclusions are selected from the group consisting of a ceramic, a metal, and a composite.

6. A method of armoring a surface of an object comprising the steps of applying the armor composite of claim 1 to a surface of an object.

7. The method of claim 6, wherein said object is selected from the group consisting of a building, a vehicle, and an article of clothing.

8. The method of claim 6, wherein said rigid inclusions are wrapped, before encapsulation, in aramid fibers, polyethylene fibers, nylon fibers, ballistic clothing, ballistic fiber, or a mixture thereof.

9. The method of claim 6, wherein said ceramic inclusions comprise a facing of E-glass or aramid fibers.

10. The method of claim 6, wherein said object is the undercarriage of a land vehicle.

11. The composite of claim 1, wherein said rigid inclusions are semispherical- or ball-shaped.

12. The composite of claim 1, wherein said rigid inclusions are tiles.

13. The composite of claim 1, wherein said elastomer consists essentially of polyurea.

14. An armored material comprising an elastomer layer attached to a substrate, said elastomer layer having a plurality of rigid inclusions, said rigid inclusions being completely encapsulated within said elastomer, said elastomer having a strain rate sensitivity-hardening of about 1000/sec to 1,000,000/sec and undergoing strain rate hardening under both ballistic and blast conditions, wherein said elastomer comprises polyurea or a blend or polyurea and polyurethane.

15. The armored material of claim 14, wherein said substrate is selected from the group consisting of the surface of a building, the surface of a vehicle, and an article of clothing.

16. The armored material of claim 14, wherein said substrate is selected from the group consisting of aluminum, steel, fiber reinforced plastic, and canvas.

17. The composite of claim 14, wherein said rigid inclusions are shaped such that, upon penetration of said elastomer by an object, any off-axis momentum generated by said penetration is converted into torque.

18. The composite of claim 17, wherein said rigid inclusions are semispherical- or ball-shaped.

19. An armor laminate comprising a rigid plate sandwiched by an elastomer, said elastomer having a strain rate sensitivity-hardening of about 1000/sec to 1,000,000/sec and undergoing strain rate hardening under both ballistic and blast conditions, wherein said elastomer comprises polyurea or a blend or polyurea and polyurethane.

20. The armor laminate of claim 19, wherein said rigid plate is selected from the group consisting of a ceramic, a metal, and a composite.

21. The armor laminate of claim 19, wherein said elastomer has a Young's modulus of at least about 4000 psi at 400% strain.

22. The armor laminate of claim 21, wherein said elastomer has a strain rate sensitivity hardening of about 10,000/sec to 1,000,000/sec.

23. The armor laminate of claim 19, wherein said elastomer has an elongation of at least about 400%.

24. A method of armoring a surface of an object comprising the steps of applying the armor laminate of claim 19 to said surface of said object.

25. The method of claim 24, wherein said object is selected from the group consisting of a vehicle, a building, and an article of clothing.

26. The armor laminate of claim 19, wherein said elastomer consists essentially of polyurea.

27. An armor composite comprising an elastomer having a plurality of rigid inclusions, said rigid inclusions being completely encapsulated within said elastomer, and said elastomer undergoing strain rate hardening under both ballistic and blast conditions, wherein said elastomer comprises polyurea or a blend or polyurea and polyurethane.

28. The composite of claim 27, wherein said elastomer consists essentially of polyurea.

29. An armored material comprising an elastomer layer attached to a substrate, said elastomer layer having a plurality of rigid inclusions, said rigid inclusions being completely encapsulated within said elastomer, said elastomer undergoing strain rate hardening under both ballistic and blast conditions, wherein said elastomer comprises polyurea or a blend or polyurea and polyurethane.

* * * * *